3,070,570
PAVING COMPOSITION COMPRISING AGGREGATE PLUS STEAM CRACKED PETROLEUM RESIN

Albert M. Gessler, Cranford, and William J. Sparks, Westfield, N.J., assignors to Esso Research and Engineering Company, a corporation of Delaware
No Drawing. Filed Aug. 3, 1959, Ser. No. 831,043
13 Claims. (Cl. 260—41.5)

This invention relates to novel compositions comprising aggregates and/or fillers bonded with certain thermoplastic synthetic resins, and to methods of preparing such compositions.

The invention comprises a thermoplastic composition of resin-bonded aggregate having suitable thermoplastic processability and, when shaped, compacted and cooled, having desirably high strength and flexibility characteristics over a wide temperature range from very hot to very cold. Such a composition may comprise for instance a fine sand having a coating of about 2 to 8% by weight of a steam-cracked petroleum resin.

Various types of steam-cracked petroleum resins may be used for carrying out the invention, but generally any thermoplastic relatively linear type steam-cracked petroleum resin having a softening point between about 125° F. and about 230° F., preferably between 150° F. and 215° F., of low or no aromatic content and substantially free of cross-linking, can be used. These resins also should have a melt viscosity (cps.) of about 100–30,000, preferably about 150–20,000, at practical hot mixing and forming temperatures of about 200–500° F., preferably 250°–400° F. These resins also desirably should have a cold/hot viscosity ratio (300° F./500° F.) below 40, preferably about 1–20. The average molecular weight of these resins is about 1,000 to 1,500; and their sp. gr. (25/25° C.) is about 0.96–0.98, and generally about 0.97.

These resins are essentially methylated or other alkylated paraffin chains containing only a small amount of unsaturation, either of trans type II or terminal double bond. Tertiary hydrogen atoms produce misleading results when the material is analyzed for unsaturation by the Wijs iodine method unless a correction is made for substitution. An iodine value of 120 by the usual (Wijs) method when corrected for the presence of hydrogen halide from substitution gives a corrected iodine value of 23. The C/H ratio is about 6.0–7.0, preferably 6.2–6.6.

Typical properties of a steam-cracked petroleum resin having a softening point of 212° F. (100° C.) are given herebelow in Table I.

TABLE I

Physical:
    Form, thermoplastic solid.
    Softening point (ball and ring) _____ ° C__ 100
    Specific gravity at 25/25° C. _____ 0.97
    Color, Gardner scale _____ 15
    Flash point (C.O.C.) _____ ° C__ 260
    Fire point _____ ° C__ 270
    Soluble in aliphatics and aromatics.
Chemical:
    Acid number _____ 1
    Saponification number _____ 2
    Ash, weight percent _____ 0.2
    Bromine number _____ 8
    Molecular weight, average _____ 1,100
    Double bonds per molecule, average _____ 2

The steam-cracked petroleum resins used in this invention are made by mild Friedel-Crafts polymerization of a highly unsaturated liquid boiling in the vicinity of the naphtha boiling range, and containing mostly $C_6$ to $C_9$ hydrocarbons resulting from the steam-cracking of petroleum fractions such as naphtha, kerosene, gas oil, etc. with about 50 to 100 mole percent of steam at temperatures of about 1,000 to 1,500° F. Generally, in commercial operations, butadiene is removed, and usually also the isoprene. The resulting liquid which is available for use as polymerization feed to make the resin may have a boiling range of about 20 to 280° C. depending upon the boiling range of the cracking feed and conditions used for the steam-cracking operation. Thus the polymerization feed may have various boiling ranges, e.g., from 20 to 170° C., or from about 30 to 280° C., etc. The distribution of the constituents within these fractions may, of course, vary somewhat, but may be illustrated as follows for a feed having an overall boiling range of 20 to 170° C.

| Boiling point range of fraction (° C.): | Percent by weight |
|---|---|
| 70– 70 | 0–60 |
| 70–130 | 65–40 |
| 130–170 | 35– 0 |

In general, the over-all chemical composition of this polymerization feed is as follows.

| Composition: | Percent |
|---|---|
| Aromatics | 19–49 |
| Diolefins | 8–25 |
| Olefins | 68–30 |
| Paraffins and naphthenes | 5– 1 |

As steam-cracked petroleum fractions may contain a small amount of cyclodienes such as cyclopentadiene, methylcyclopentadiene, etc. and since it is preferred to exclude such cyclodienes from the polymerization feed for the purposes of the present invention, the steam-cracked naphtha is subjected to heating to about 90–140° C. to dimerize the cyclodienes, and then carefully distilling to take the $C_5$ to $C_9$ constituents overhead and to leave as residue the dimerized cyclodienes. The resulting cyclodiene-free steam cracked petroleum naphtha (for instance a fraction boiling from about 20 to 140° C.) would have a chemical composition about as follows.

| Composition: | Percent |
|---|---|
| Benzene | 15–30 |
| Toluene | 3–10 |
| $C_8$ aromatics | Below 1 |
| Diolefins | [1] 11–25 |
| Olefins | [1] 70–29 |
| Paraffins | 0– 5 |

[1] The only reactants in polymerization.

It should be noted that since the polymerization process used for making the resin is relatively mild, the benzene and toluene or other aromatics and paraffins, do not enter into the reaction, but merely act as diluents, and are subsequently removed when the resin is stripped of volatile solvent, and low boiling polymerization products.

The polymerization is generally carried out at about −40° C. to +70° C. with about 0.25–3.0% of a Friedel-Crafts catalyst such as $AlCl_3$, $BF_3$, $TiCl_4$, etc., as, for instance, a temperature of 25° C. with 1% of powdered $AlCl_3$ (of about 30 mesh) as catalyst. When the polymerization is fiinished, the reactor contents may be washed with 5% aqueous NaOH, and several times with water, and then heated under vacuum, e.g., 5 to 50 mm. pressure absolute, to strip off volatile constituents and leave a light-colored resin. By stripping to higher temperatures and under higher vacuum conditions, the softening point of the resin may be raised from the vicinity of 150° F. to 212 or 215° F. These resins may be made by the processes outlined further in detail in U.S. Patents 2,734,046, 2,770,613, and others.

If especially light-colored, or substantially colorless resins are desired, or resins of low or substantially zero unsaturation, the resins prepared as above may be further treated by hydrogenation, as described in Patent 2,824,860.

If desired, two or more different individual types of steam-cracked petroleum resins may be mixed together in any desired proportions in order to obtain a blend having a desired combination of softening point, color, viscosity, cold/hot viscosity ratio (300° F./500° F.), etc.

In order to illustrate a variety of different individual setam-cracked petroleum resins which may be made, the various hydrocarbon streams containing olefins, diolefins, aromatics, and saturated hydrocarbons obtained by steam-cracking of gas oils were polymerized in the presence of a Friedel-Crafts type catalyst at various temperatures. The resins were recovered by stripping off the unreacted hydrocarbons by vacuum distillation. Analysis in each case indicated that the resin was of a non-aromatic structure, since little or none of the aromatic constituents of the feed entered the composition. The data are summarized in the following table:

bulk articles, e.g., from ½" to 1 foot, or 5 feet or more in thickness, with or without an over-lying finer surface coating, large crushed aggregates may be used, such as crushed stone, gravel and air-cooled slag, having either a mixed grading of ½" to 3", or ¼" to 2" or ½" to 1", etc. Alternatively, if a fairly thick section, e.g. 2" to 1 foot or more is to be used without any finer surface coating, the aggregate used may be composed of both coarse and fine aggregate and may include a dust filler, such as a mixture of 100 parts by weight of coarse stone, 80 parts by weight of sand, and 4 to 5 parts by weight of powdered limestone. The above aggregates may be graded either for density and lowest voids, or for a controlled desired amount of voids, e.g., 3%, 5%, 8%, etc. voids.

If desired, the fine fillers to be used, e.g., crushed silicas, clays, ground limestone, or even carbon black, etc. may be subjected to severe attrition, e.g. by ball-milling with steel balls, or roll-milling one or several times through tight set steel rolls, or stamping or any other severe attrition, prior to mixing with the polymer to be coated. It has been found that such severe attrition activates the

TABLE II

| Resin No | 1 | 2 | 3 | 4 | 5 | 6 | 7 | 8 | 9 |
|---|---|---|---|---|---|---|---|---|---|
| Approx. boiling pt. (° C.) of polym. feed | 20–48 | 20–125 | 20–125 | 38–130 | 48–130 | 48–130 | 30–260 | 85–260 | 85–260 |
| Composition, weight percent (approx.): | | | | | | | | | |
| Diolefins | 30 | 20 | 20 | 19.4 | 12 | 12 | 15 | 15 | 15 |
| Olefins | 60 | 48 | 48 | 50.6 | 50.9 | 50.9 | 62 | 45 | 45 |
| Aromatics: | | | | | | | | | |
| Benzene | | 25 | 25 | 22 | 28.5 | 28.5 | 4.5 | | |
| Toluene | | 6 | 6 | 7 | 7.6 | 7.6 | 10.1 | 10 | 10 |
| Higher | | | | | | | 7.2 | 15 | 15 |
| Paraffins, naphthenes | 10 | 1 | 1 | 1 | 1 | 1 | 1.2 | 15 | 15 |
| Polymerization: | | | | | | | | | |
| Catalyst | $AlCl_3$ | $AlCl_3$ | $AlCl_3$ | $AlCl_3$ | $AlCl_3$ | $BF_3$ | $AlCl_3$ | $AlCl_3$ | $BF_3$ |
| Temperature (° C.) | 15 | 25 | 100 | 45 | 45 | 25 | 25 | 20 | 10 |
| Resin, weight percent [1] | 65–85 | 25–35 | 19 | 30–36 | 18–23 | 15 | 20–30 | 16 | 11 |
| Soft pt. (° C.) [1] | 70–85 | 70–90 | 66 | 85–95 | 80–95 | 74 | 85–100 | 96 | 76 |

[1] The exact softening point and yield depend upon the degree of work-up of the resin, such as stripping conditions, etc.

Although for many purposes it is preferred to use the above-mentioned thermoplastic linear type hydrocarbon resins alone as the sole constituent of the binder, it may be desirable, for special applications or circumstances, to use 1 to 40% or so, preferably about 5 to 20%, of various types of additives, such as elastomeric modifiers, e.g., butyl rubber, hevea, GR-S, neoprene, diene-nitrile rubber, etc., as disclosed and claimed in copending application Serial No. 39,767, filed June 30, 1960, which is a continuation in part of this application, or lower mol. wt. plasticizers, e.g., mineral oils, fatty oils, waxes, and natural or synthetic resins, e.g., hydrogenated abietate, coumarone-indene resins, natural petroleum resins, thermal or catalytic-cracked petroleum resins (which have undesirably higher aromatic content, higher sp. gr. and higher cold/hot viscosity ratio (300° F./500° F.) than steam-cracked petroleum resins), chlorinated paraffin wax resins, styrene-isobutylene resins, or high styrene-low diene resins, etc., or 1–30% or so of high melting polyolefins, e.g., polypropylene of 50,000–100,000 mol. wt. Such plasticizing or softening additives permit the use of linear thermoplastic resins of much higher softening point and large amounts of elastomeric additives than would be practical without them.

The aggregates to be used according to the invention may be of numerous conventional types or certain specially adapted types, as will be discussed further herebelow. For thin sections or surface layers, e.g., about ⅟₁₆" to ½" or so, a fine aggregate should be used, such as a sand having a grading of about ¼" down to 100 mesh, or a finer sand ranging from 8 mesh to 100 mesh may be used; or even finer fractions may be used, such as 20 mesh to 100 mesh, and with any of these, some dust-type filler may be used, such as ground limestone, pulverized sand, silicas, clays, etc. For coarser sections, slabs or surface of the filler particles at the places where the particles have been broken or otherwise attrited, and thereby provides a tighter bond when the resin is subsequently coated thereon, and the mixture is shaped, compacted and cooled.

Various methods may be used in carrying out the present invention, depending upon various factors such as the particular type of resin composition used, the type of aggregates used and according to the type of mixing equipment available. The preferred technique, referred to as hot plastic mixing, is to heat the resin composition to be used, to a temperature about 100–300° F. above its softening point, until it has softened to a hot fluid consistency, and then stir the aggregate, preferably dried and preheated, into it, preferably gradually, until the final composition comprises about 90 to 99% by weight of aggregate and about 1 to 10%, preferably about 2 to 8% by weight of resin.

Thus, for example, a steam-cracked petroleum resin having an average mol. wt. of about 1,100, which has a softening point of about 212° F. (by ring-and-ball method, ASTM standards, D36-26) may be heated to a temperature of about 300 to 450° F. and then a sand having a grading of about ¼" down to 100 mesh, preheated to a similar temperature, is gradually added with continued mixing until the mixture contains about 95% by weight of sand and 5% of resin and is substantially homogenous. This hot mixture is then ready for use in forming blocks, slabs, or other articles, or for application to a road surface where it is then compacted by rolling or tamping or any other suitable method. Alternative resin compositions may be used, such as one having a softening point of 158° F. or 185° F. or a mixture of about 40 to 80% by weight of 212° F. softening point resin mixed with about 20 to 60% by weight of similar steam-cracked petroleum resin having a softening point of 158° F., each being polymerization products of a feed in which the reactants comprise essentially about 25% aliphatic dienes, and about 75% aliphatic alkenes. Another resin composition which can be used comprises about 10 to 50% of polypropylene having an average mol. wt. of about 50,000 to 100,000, mixed with about 50 to 90% by weight of steam-cracked petroleum resin having an average mol. wt. of about 1,000 and having a softening point of about 158° F.

One advantage of adding some, e.g., 10–50%, crystalline-type polymer such as crystalline polypropylenes to the steam-cracked petroleum resin as the binder for the aggregates, is that the resulting composition, when shaped, compacted and cooled, is substantially oil-resistant. This means, for instance, that it is resistant to softening by jet fuel spillage on airport runways, airplane carrier runway decks, etc., and also resistant to softening by gasoline, kerosene or lubricating oil, which may accidentally come in contact with paved surfaces around gasoline filling stations, repair garages, etc. For instance, slabs of such resin-polymer-bonded sand, about 4' x 8' in area, and ½" or 1" thick can be precast or molded, in a factory, and then cemented in place as a complete floor covering in a commercial garage or at a service station, preferably using an ordinary asphalt cement or various available plastic cements as a grouting to insure a good bond between the slabs and the underlying floor surface.

Similar resin-sand compositions with or without polypropylene or other modifier, may be hot-molded in the shape of ordinary bricks or "concrete blocks," and used for building walls, floors, partitions, etc., or for special paving purposes, such as a surface coating on bridges, which are subject to excessive vibration, wide temperature fluctuations, ect., where concrete, asphalt paving and wooden blocks are not as satisfactory as desirable.

For paving highways, airport runways, airplane carrier decks, parking lots, bus stations, etc., such oil-resistant polypropylene-resin-sand compositions may be hot-rolled directly in place, either as a thin surface layer, e.g. ¼", ½" or an inch or so thick, or, together with coarse aggregate, as a 2" to 8" or thicker load-supporting base layer, and then covered with a thin seal coat on the surface. Depending on the color of the fine aggregate used, or the dust filler used (if any), the resin-bonded sand surface layer will be found to be lighter than conventionally used asphalt surfacing, and therefore will give better visibility for night driving, particularly when the roads are wet.

A great advantage of the present compositions is that the thermoplastic resins used are all pale yellow to essentially colorless, i.e. a Gardner color preferably as light as or lighter than 15, and therefore when mixed with sand, with or without filler, they can easily be given any desired color by adding a relatively small amount of a pigment. For instance, for a white, or light gray, a few (e.g. 0.5–5.0) percent of white titanium dioxide pigment may be used. For other purposes, red, yellow, orange, green, blue, or even black pigments may be used, as for identifying traffic guides or certain areas of paving, etc., or for ornamental purposes, in manufactured articles, etc.

Another novel method of using the compositions of this invention, e.g. a mixture of a fine sand of about 20 mesh to 100 mesh or 200 mesh, coated with about 4 to 6% or 8% of a steam-cracked petroleum resin of about 212° F. softening point, may be hot mixed and then sheeted out into thin sheets or films ranging from ¼" thick to 1/16", 1/32" by passing the hot mixture through one or more pairs of rolls cold enough to make the sheet maintain its shape, and additionally cooling, if necessary, with cold air, water spray, or a water bath, drying, and finally rolling up the resulting flexible strip into large rolls. These rolls, which may be any desired width, such as only 2" to 1 foot in width for marking traffic lines on highways, etc. up to 4 feet, 6 feet, 8 feet, or more in width for laying down a light-colored oil-resistant and jet-blast resistant surface coating (if it contains oil-resistant polypropylene, polyvinylchloride, etc. type of additive), on airport runways, airplane carrier decks, etc., or a surface coating to merely lighten up the color of an asphalt highway or to smoothen over a rough concrete highway. Such a strip roll material may also be used in place of conventional tar paper for covering sloping roofs, or, where they are especially advantageous, for flat roofs, because such resin-bonded sand is not subject to serious deterioration by oxidation and cracking as is the case with asphalt. For roofing purposes, one or two percent of carbon black may be to the composition in order to stabilize against the depolymerizing effect of ultraviolet light and sunlight, or colorless ultraviolet light absorbers may be added.

The composition of this invention may also be used for paving the beach runways, beach groins, jetties and levees, either by hot rolling method, or coating with preformed thin slabs or strip rolls.

Numerous molded or extruded articles may be formed from these resin-bonded aggregate compositions. Conduit pipe may be extruded in various dimensions, e.g. from small sizes such as ½" inside diameter to larger and thicker conduits of 5" or 6" inside diameter. With a light-weight vermiculite filler, instead of or in addition to fine sand or other filler, these compositions make excellent sound-deadening thermal insulation. Acid-resistant battery boxes may readily be molded from these compositions. Likewise, smaller, thinner articles such as phonograph records, as well as numerous pans, buckets, bowls, or other containers, various tools, or tool-handles, doorknobs, telephone receivers, instrument housings, electrical insulators, etc. may be readily made by selection of appropriate thermoplastic steam-cracked petroleum resin and type and screen size of filler, within the purview of the present invention.

Larger or more bulky articles may also be formed, either by molding or tamping, e.g., railroad ties, large diameter pipes, e.g., 1 foot or 5 feet or more in diameter, with or without steel wire or mesh reinforcing, for conducting water, or for use in sewage systems, or gas mains, or for transporting crude oil or refined petroleum liquids. Other hydraulic structure include water tanks, reservoirs, dam spillways, etc., or storage tank bottoms, etc. Precast structural columns, e.g. telephone poles, piles, etc. may be made. Such piles have the advantage that sections thereof are joinable by thermoplastic welding, i.e. by heat-softening the ends of two units which are then combined under suitable pressure and permitted to cool until solidified.

The present resin-bonded filler compositions may be further modified by the addition of a small amount, e.g. 10 to 75% by weight, of a volatile solvent, such as naphtha or kerosene, toluene, etc., sufficient to give fluidity for application by painting with a brush, or spray painting, or a more plastic consistency suitable for troweling in place, or by coating on flat surfaces as with a doctor blade, etc. by machine.

Relatively thin coatings, for instance of a steam-cracked petroleum resin-bonded sand, may advantageously be applied by a hot rolling or hot pressing technique onto the surface of concrete blocks or cinder blocks, either just on the exterior side to be exposed to the rain and weather or in contact with wet earth as in a house foundation, or may be applied to both the interior and exterior surfaces, or if desired all of the surfaces of such blocks or construction slabs made of concrete, clay bricks, or even wood, may be coated with a relatively thin layer of these thermoplastic resin-bonded sand compositions.

For coating either small or large diameter pipes or for protecting electric cables to be placed underground or underwater, one or more layers of resin-bonded filler, having a resin content of about 5 to 10%, and having a thickness ranging from a few mils to an inch or so (or even thicker) if handled in the heated condition, can be applied by the spiral strip coating method. The present compositions are low enough in cost to economically permit the use of coatings 1/8" or 1/4" or so in thickness around large steel pipe, to prevent corrosion thereof, whereas the relatively thin films of polyethylene now sometimes used for such spiral coating of steel pipe, are so thin that they are readily subject to mechanical damage by contacting with rough, rocky surfaces or by contact with mechanical equipment or tools. On the other hand, it would be far too expensive to use sheets of plain polyethylene 1/8" or more thick.

The compositions of the present invention, at least when used in substantial thicknesses, are relatively fireproof or fire-resistant, except when exposed to high temperatures over a long time. However, if desired to increase the fire resistance of articles made of the present compositions, various fireproofing materials may be incorporated such as highly chlorinated naphthalenes, phosphates, silicates, etc.

An additional method of using the compositions of this invention, not practical with materials available heretofore, is to make large sheets or slabs, containers, piping, etc. by a technique analogous to that used in making corrugated paper board, but using thermoplastic heat-sealing for bonding a flat sheet of resin-bonded aggregate composition on either one side or both sides of a corrugated sheet of similar resin-bonded aggregate. Such corrugated sheets may be readily made while the sheet is still in a hot forming condition. For effecting the desired heat-sealing, the outer edges of the corrugated sheet may be passed near or through a hot flame or other heating element, and the side of the flat sheet to be bonded therewith may also be heated at least sufficiently to make it tacky so that it will bond readily to the corrugated surface when contacted therewith under slight pressure. Laminated slabs of great strength can be made by bonding together two or more of the resulting corrugated slabs, with the corrugation "grain" at right angles to each other.

The details and the advantages of the invention will be better understood from a consideration of the following specific examples:

EXAMPLES 1 TO 3

A steam-cracked petroleum resin having a softening point (ring-and-ball method) of about 212° F., an average mol. wt. of about 1,100, a specific gravity (25/25° C.) of about 0.97, and a bromine number of about 8, and polymerized with about 1% of $AlCl_3$ as catalyst, at about room temperature, from a feed having a boiling range of about 20–140° C. and containing about 14–20% diolefins, about 45–52% olefins and about 28–41% of inert aromatics and saturated hydrocarbons, was heated to about 350–400° F. and mixed in a concentration of 6.5% by weight with coarse and fine aggregate, using the following formulation.

| Material: | Parts by wt. |
|---|---|
| 1/2" stone | 180 |
| 3/8" stone | 450 |
| Sand | 492 |
| Binder (resin) | 78 |

The aggregate had also been preheated to a similar temperature. After thoroughly mixing the hot liquefied resin and the hot aggregate, to a hot thermoplastic mouldable mixture, it was tamped into a hollow cylindrical mold, about 3" high and 4" in diameter, used for making Marshall stability tests. This test is described in the pamphlet, "The Marshall Method for the Design and Control of Bituminous Paving Mixtures," published by the Marshall Consulting and Testing Laboratory. In making the tests, the resin-bonded aggregate cylinder (after cooling) is removed from the mold and subjected to a load applied diametrically about the circumference at a constant rate of 2" per minute until failure (or until maximum load). The load, in lbs., at failure, or the maximum load, is called the Marshall stability, and indicates the strength of the composition against shearing forces. The amount of deformation at failure (or at maximum load) is given in 1/100 of an inch, and is called the "flow." The Marshall stability test is usually made at 140° F., but may also be made at other temperatures for comparison.

The composition of Example 1 showed a Marshall stability (at 140° F.) of 15,000 lbs. and a flow of 15. These tests were also repeated to get the Marshall stability and flow at successively lower temperatures, i.e. 100° F., 75° F., and 30° F., and also, the stability/flow ratio was calculated, because in general, for purposes of the present invention, it is desired to have a stability/flow ratio of about 250–3,000, or preferably 300–2,000, when tests were made at 140° F. These values are substantially superior to those, for instance a value of only 14, for a corresponding asphalt-aggregate composition containing an asphalt having a penetration of 85–100 at 77° F.

Example 1 was repeated twice except for the substitution of a stream-cracked petroleum resin having a softening point of 185° F. in Example 2, and 158° F. in Example 3.

The data for all three of these examples are summarized in the table herebelow:

TABLE III

*Concrete Made With Steam-Cracked Petroleum Resins*

| Example | 1 | | 2 | | 3 | |
|---|---|---|---|---|---|---|
| Name of resin | Piccopale 100 | | Piccopale 85 | | Piccopale 70. | |
| Softening point of resin (° F.) | 212 | | 185 | | 158. | |
| Temp. of mixing with aggregate (° F.) | 400–500 | | 350–450 | | 300–400. | |
| | Stability | Flow | Stability | Flow | Stability | Flow |
| Marshall tests: | | | | | | |
| 140° F | 15,000 | 15 | 5,000 | 22 | 3,000 | 13 |
| 100° F | 21,000 | 11 | 23,000 | 7 | 18,700 | (7) |
| 75° F | 20,000 | 11 | 21,400 | 8 | 28,500 | 4 |
| 30° F | 15,000 | | 19,000 | 13 | 23,000 | 29 |
| 140° F. stability/flow | 1,000 | | 228 | | 230. | |
| 140° F. stability/softening point (° F.) of resin | 70.7 | | 27 | | 19. | |
| Cold/hot stability ratio (75° F./140° F.) | 1.3 | | 4.3 | | 9.5. | |

The above data show that all three of the steam-cracked petroleum resins tested which had softening points ranging from 212° F. down to 158° F. has satisfactory 140° F. stability values substantially in excess of 2,000 lbs., actually ranging from 15,000 down to 3,000. They also had satisfactory flow values, and in each case the 140° F. stability/flow ratio was well above 200, which is about the highest possible value with any asphalt composition. These three resin concrete compositions had stability flow ratios ranging from 1,000 down to 228, compared to the coresponding value of 14 for an asphalt concrete made with an asphalt having a penetration of 85–100 at 77° F. The above data also show that all three of these resins permit making concrete having relatively a much higher 140° F. stability for any particular softening point of the resin than would be obtained with a corresponding asphalt composition. This is indicated by the 140° F. stability/ softening point ratio ranging from 70 to 19 for the resin concrete samples, compared to a corresponding value of 3 for an asphalt concrete made with an asphalt having an 85–100 penetration at 77° F. Finally, the above data also show that these resin concrete compositions have an exceedingly desirable low cold/hot stability ratio (75° F./ 140° F.), ranging from 1.3 to 9.5, compared to the much higher value of 16.3 for an asphalt concrete made with an asphalt having an 85–100 penetration at 770 F. The meaning of this cold/hot stability ratio is that the resin concrete compositions, whether used for manufacturing concrete blocks, slabs, or used for paving roads, etc., do not lose nearly as much of their strength when heated as corresponding asphalt compositions do. Thus, various articles of construction made of these resin compositions would maintain their structural stability at higher temperatures, for instance in warmer climates than corresponding asphalt compositions would. On the other hand, with such excellently low cold/hot stability ratios, these resin concrete compositions do not become excessively brittle at very cold temperatures.

EXAMPLES 4 TO 7

Another series of tests was made like Examples 1 to 3 except that instead of using a steam-cracked petroleum resin as the sole binder for the aggregate, mixtures of 14 to 25% by weight of a polypropylene having an average molecular weight of about 60,000 (by Harris equation) together with 75–86% by weight of a steam-cracked petroleum resin having a softening point of about 158° F. marketed commercially under the name of Piccopale 70. The same proportions and grading of aggregates were used as in Examples 1 to 3. The test data obtained on the concrete made with these blended binders are shown in the following Table IV, with a control sample in which the binder used was only a Piccopale 70 by itself without any polypropylene.

TABLE IV

*Concrete Made With Blends of 14–25% of Polypropylene (60,000 Mol. Wt.) With 86–75% of Piccopale 70*

| Example | 4 | 5 | 6 | 7 |
| --- | --- | --- | --- | --- |
| Composition of binder: | | | | |
| Percent Polypropylene 60,000 mol. wt.) | 0 | 14 | 16.7 | 20 | 25 |
| Percent piccopale 70 | 100 | 86 | 83.3 | 80 | 75 |
| Marshall stability (at 140° F.) | 3,000 | 11,300 | 10,350 | 11,600 | 15,100 |
| Marshall flow | 13 | 17 | 21 | 23+ | 20 |
| Stability/flow ratio | 230 | 665 | 493 | 503 | 755 |

The above data show that whereas the resin-bonded aggregate concrete, using the Piccopale 70 alone gave a Marshall stability (at 140° F.) of only 3,000 lbs., the addition of 14 to 25% of the high molecular weight polypropylene raised the Marshall stability to the range of about 10,000 to 15,000 lbs. The Marshall flow values were all satisfactory, and the stability/flow ratio of the concretes containing the mixed polypropylene-Piccopale binders were in the good high range of about 500 to 750, which is even better than the value of 230 when the Piccopale 70 was used alone. Even this latter value of 230 is, however, much better than the very low value of 14 obtained with the asphalt concrete using an asphalt having 85–100 penetration at 77° F.

Numerous other advantages and uses of the compositions of this invention will occur to those skilled in the art from a reading of the foregoing specification.

It is not intended that this invention be limited to the specific examples which have been given merely for the sake of illustration, but only by the appended claims in which it is intended to claim all novelty inherent in the invention and all modifications coming within the scope and spirit of the invention.

What is claimed is:

1. A paving composition comprising aggregate, the particles of which are of a size of 100 mesh and coarser, bonded with between about 1 and about 10% by weight of a thermoplastic synthetic petroleum resin obtained by the polymerization of olefins and diolefins prepared by the steam cracking of petroleum fractions, said resin having a softening point measured by the ring-and-ball method of between about 125 and about 230° F., an average molecular weight of between about 1,000 and about 1,500, a specific gravity at 25° C., with respect to a specific gravity of water of one, measured at 25° C., of between about 0.96 and 0.98, a carbon to hydrogen ratio of between about 6.0 to 1 and about 7.0 to 1, the composition having a Marshall stability measured at 140° F. of at least 2,000 lbs.

2. A paving composition according to claim 1 in which the resin has a softening point between about 150 and about 215° F. and is a polymerization product of between about 10 and about 50% of aliphatic dienes and between about 50 and about 90% of alkenes and has substantially no aromatic content, said polymerization product being formed in the presence of a Friedel-Crafts type catalyst at a temperature of between about −40° C. and about +70° C.

3. A paving composition according to claim 1 in which the resin is derived from a steam cracked petroleum naphtha fraction having a boiling range between about 20° C. and 280° C. and having approximately the following composition:

| Constituents: | Percent |
| --- | --- |
| Aromatics | 19–49 |
| Diolefins | 8–25 |
| Olefins | 68–30 |
| Paraffins and naphthenes | 5–1 | of which only the diolefins and olefins are reactants.

4. A paving composition according to claim 1 in which the ratio of the Marshall stability measured at 75° F. and then measured at 140° F. is below 12 to 1.

5. A paving composition according to claim 1 in which the resin has a softening point of about 212° F., an average molecular weight of about 1,100, a specific gravity of about 0.97 and a bromine number of about 8.

6. A paving composition according to claim 1 in which the resin has a softening point of about 185° F.

7. A paving composition according to claim 1 in which the resin has a softening point of about 158° F.

8. A paving composition according to claim 1 containing between about 0.1 and about 5% of a coloring pigment.

9. A paving composition comprising between about 92 and about 98% of aggregate, the particles of which are of a size of 100 mesh and coarser, bonded with between about 2 and about 8% by weight of a steam cracked petroleum resin having a softening point of about 212° F., an average molecular weight of about 1,100, a carbon to hydrogen ratio of between about 6.2 to 1 and about 6.6 to 1 and a bromine number of about 8, the resin-bonded aggregate paving composition having a Marshall stability measured at about 140° F. of about 15,000 lbs. and having a ratio of Marshall stability measured at 75° F. and then measured at 140° F. of about 1.3 to 1.

10. The process of preparing a paving composition which comprises preheating to a hot mixing temperature between about 250 and about 400° F., between about 1 and about 10% by weight of a thermoplastic, relatively linear type steam cracked petroleum resin having a softening point measured by the ring-and-ball method of between about 125° F. and about 230° F., an average molecular weight of between about 1,000 and about 1,500, a specific gravity measured at 25° C., as compared with a specific gravity of water of one measured at 25° C., of between about 0.96 and about 0.98 and a carbon to hydrogen ratio of between about 6.0 to 1 and about 7.0 to 1, separately preheating between about 90 and about 99% by weight of aggregate, the particles of which are of a size of 100 mesh and coarser, infusible at said hot mixing temperatures, and finally hot mixing at the aforementioned hot mixing temperatures, the prehetated resin and the preheated aggregate particles to coat the latter with the resin to make a thermoplastic composition which when compacted and cooled will have a Marshall stability measured at 140° F. of at least 2,000 lbs.

11. A paving composition as in claim 1 wherein the petroleum resin contains up to about an equal amount of its weight of polypropylene.

12. A paving composition as in claim 1 wherein the petroleum resin contains up to about an equal amount of its weight of polypropylene, having an average molecular weight of between about 50,000 and about 100,000.

13. A process as in claim 10 wherein the petroleum resin contains up to about an equal amount of its weight of polypropylene.

References Cited in the file of this patent

UNITED STATES PATENTS

| | | |
|---|---|---|
| 2,823,194 | McKay | Feb. 11, 1958 |
| 2,925,831 | Welty et al. | Feb. 23, 1960 |
| 2,939,860 | Schramm | June 7, 1960 |

FOREIGN PATENTS

| | | |
|---|---|---|
| 513,453 | Great Britain | Oct. 12, 1939 |
| 167,201 | Australia | Mar. 8, 1956 |